United States Patent [19]

Jones

[11] Patent Number: 5,407,276
[45] Date of Patent: Apr. 18, 1995

[54] DIAMOND TEMPERATURE AND RADIATION SENSOR

[76] Inventor: Barbara L. Jones, 80 Chisbury Close, Forest Park, Bracknell, England, RG12 3TX

[21] Appl. No.: 107,525

[22] Filed: Aug. 17, 1993

[30] Foreign Application Priority Data

Aug. 17, 1992 [GB] United Kingdom ............... 9217436

[51] Int. Cl.⁶ .................... G01K 7/34; H01B 3/18; H01G 7/04
[52] U.S. Cl. ................................ 374/184; 361/282
[58] Field of Search ............... 374/163, 183, 184; 361/282

[56] References Cited

U.S. PATENT DOCUMENTS

| | | | |
|---|---|---|---|
| 3,065,402 | 11/1962 | Landauer | 361/282 |
| 3,493,913 | 2/1970 | Wagner | 361/282 |
| 3,649,891 | 3/1972 | Lawless | 361/282 |
| 3,716,759 | 2/1973 | Scace et al. | 361/704 |
| 3,728,641 | 4/1973 | Fujita et al. | 361/282 |
| 4,213,797 | 7/1980 | Sher | 361/282 |
| 4,545,254 | 10/1985 | Lawless et al. | 374/184 |
| 4,883,366 | 11/1989 | Dohi et al. | 374/184 |
| 5,027,253 | 6/1991 | Lauffer et al. | 361/321 |
| 5,102,720 | 4/1992 | Raj | 361/761 |

FOREIGN PATENT DOCUMENTS

| | | | |
|---|---|---|---|
| 0998534 | 7/1965 | United Kingdom | 361/282 |
| 1260730 | 1/1972 | United Kingdom | 361/282 |

Primary Examiner—Diego F. F. Gutierrez
Attorney, Agent, or Firm—Scully, Scott, Murphy & Presser

[57] ABSTRACT

A temperature sensor comprises a body of insulating diamond material and a pair of spaced apart electrical contacts applied to the body. The body has a predetermined thickness between the contacts, and the contacts have a predetermined area, so that the sensor has a corresponding capacitance between the contacts which is temperature dependent. The diamond body may comprise a diamond crystal, or may be a layer of diamond deposited on a substrate by a CVD process. In the latter case, the substrate may be a semi-conductive silicon layer, which serves as one of the contacts. The other contact may be a metallic contact, or may comprise a layer of doped amorphous semi-conductive material. The sensor is sensitive to ionizing radiation as well as to changes in temperature, and is suitable for use in a temperature compensated radiation measuring apparatus.

11 Claims, 3 Drawing Sheets

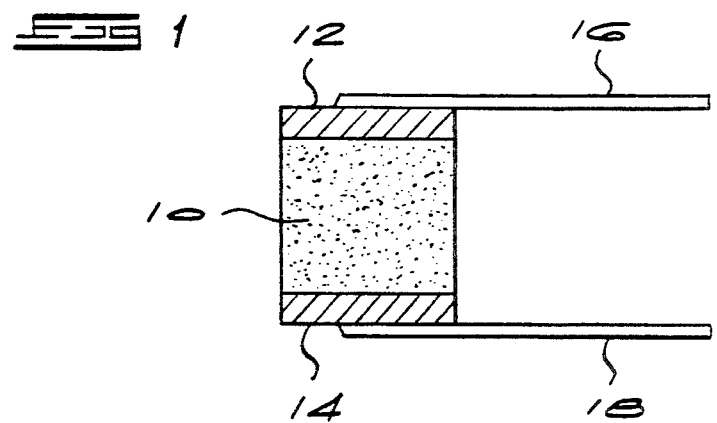
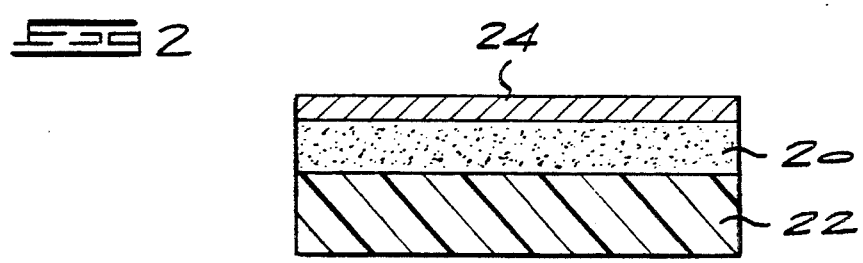
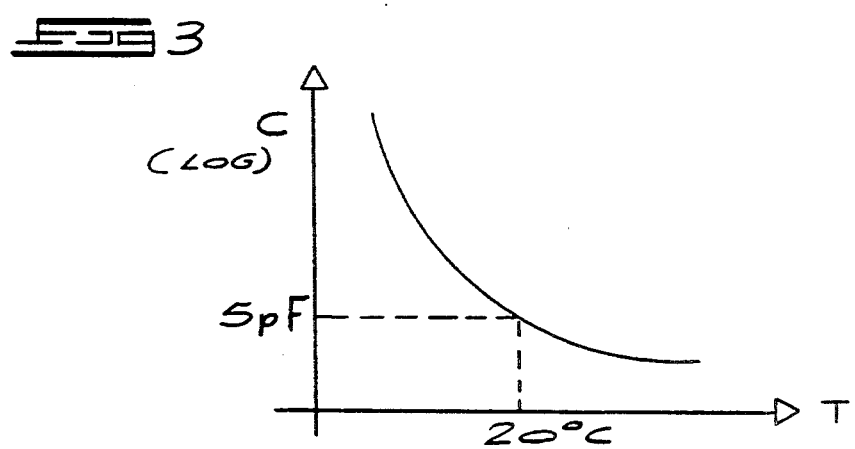

5,407,276

DIAMOND TEMPERATURE AND RADIATION SENSOR

BACKGROUND OF THE INVENTION

The invention relates to a temperature sensor formed from diamond material which is sensitive to temperature and also to ionizing or nuclear radiation.

SUMMARY OF THE INVENTION

According to the invention a temperature sensor comprises a body of insulating diamond material and a pair of spaced apart electrical contacts applied to the body, the body of diamond material having a predetermined thickness between the contacts, and the contacts having a predetermined area, so that the sensor has a corresponding capacitance between the contacts which is temperature dependent.

The diamond body may comprise a type Ia, type Ib or type IIa natural or synthetic diamond crystal.

The diamond body may further comprise a layer of undoped diamond material deposited by a chemical vapour deposition process.

The layer of diamond may be deposited on a conductive or semi-conductive substrate.

The substrate may comprise doped silicon.

The doped silicon substrate may function as one of the electrical contacts.

At least one of the electrical contacts may be metallic and may comprise, for example, titanium; aluminum, nickel or chrome.

At least one of the electrical contacts may comprise doped amorphous semiconductor material deposited on the diamond body.

The invention extends to temperature measurement apparatus which comprises a temperature sensor as defined above and which further comprises an oscillator circuit, the sensor being connected as a feedback element in the circuit so that the output frequency of the oscillator varies with the temperature of the sensor.

The invention further extends to radiation measurement apparatus which comprises a temperature sensor of the invention and further comprises charging means for applying an electrical charge to the sensor at a predetermined charging rate, and monitoring means for monitoring the resultant voltage on the sensor, thereby to measure the intensity of ionizing radiation indent on the sensor.

The invention still further extends to radiation measurement apparatus which comprises a temperature sensor of the invention and further comprises pulse or conduction mode measuring means for measuring pulse or conduction mode electrical signals due to ionizing radiation incident on the sensor and for generating a first electrical signal corresponding thereto, capacitance measuring means for measuring the capacitance of the sensor as a function of temperature and for generating a second electrical output signal corresponding thereto, and compensating means responsive to the first and second electrical output signals to generate an output signal corresponding to the intensity of the radiation incident on the sensor, which is compensated for changes in temperature.

The invention additionally extends to a method of measuring temperature including the steps of providing a temperature sensor which comprises a body of insulating diamond material and a pair of spaced apart electrical contacts applied to the body, the body of diamond material having a predetermined thickness between the contacts, and the contacts having a predetermined area, so that the sensor has a corresponding capacitance between the contacts which is temperature dependent; locating the sensor in art environment or against an object to be measured; measuring the capacitance between the contacts or an electrical parameter related thereto; and relating the measured capacitance or electrical parameter to a reference capacitance or electrical parameter to determine the temperature of the environment or the object.

The method may include connecting the sensor as a feedback element in an oscillator circuit, and relating variations in the temperature measured by the sensor to corresponding variations in the oscillation frequency of the oscillator circuit.

The invention includes a method of measuring radiation including the steps of providing a temperature sensor which comprises a body of insulating diamond material and a pair of spaced apart electrical contacts applied to the body, the body of diamond material having a predetermined thickness between the contacts, and the contacts having a predetermined area, so that the sensor has a corresponding capacitance between the contacts which is temperature dependent; applying an electrical charge to the sensor at a predetermined charging rate; and monitoring the resultant voltage on the sensor, thereby to measure the intensity of ionizing radiation incident on the sensor.

The invention further includes a method of measuring radiation including the steps of providing a temperature sensor which comprises a body of insulating diamond material and a pair of spaced apart electrical contacts applied to the body, the body of diamond material having a predetermined thickness between the contacts, and the contacts having a predetermined area, so that the sensor has a corresponding capacitance between the contacts which is temperature dependent; subjecting the sensor to ionizing radiation; measuring pulse or conduction mode electrical signal due to the ionizing radiation and generating a first electrical output signal corresponding thereto; measuring the capacitance of the sensor as a function of temperature and generating a second electrical output signal corresponding thereto; and processing the first and second electrical output signals to generate an output signal corresponding to the intensity of the radiation incident on the sensor, which is compensated for changes in temperature.

BRIEF DESCRIPTION OF THE DRAWINGS

FIG. 1 is a schematic sectional side view of a first embodiment of a diamond temperature sensor according to the invention;

FIG. 2 is a schematic sectional side view of a second embodiment of the temperature sensor;

FIG. 3 is a graph indicating the electrical characteristic of the sensor with temperature;

DESCRIPTION OF EMBODIMENTS

Figure 4:
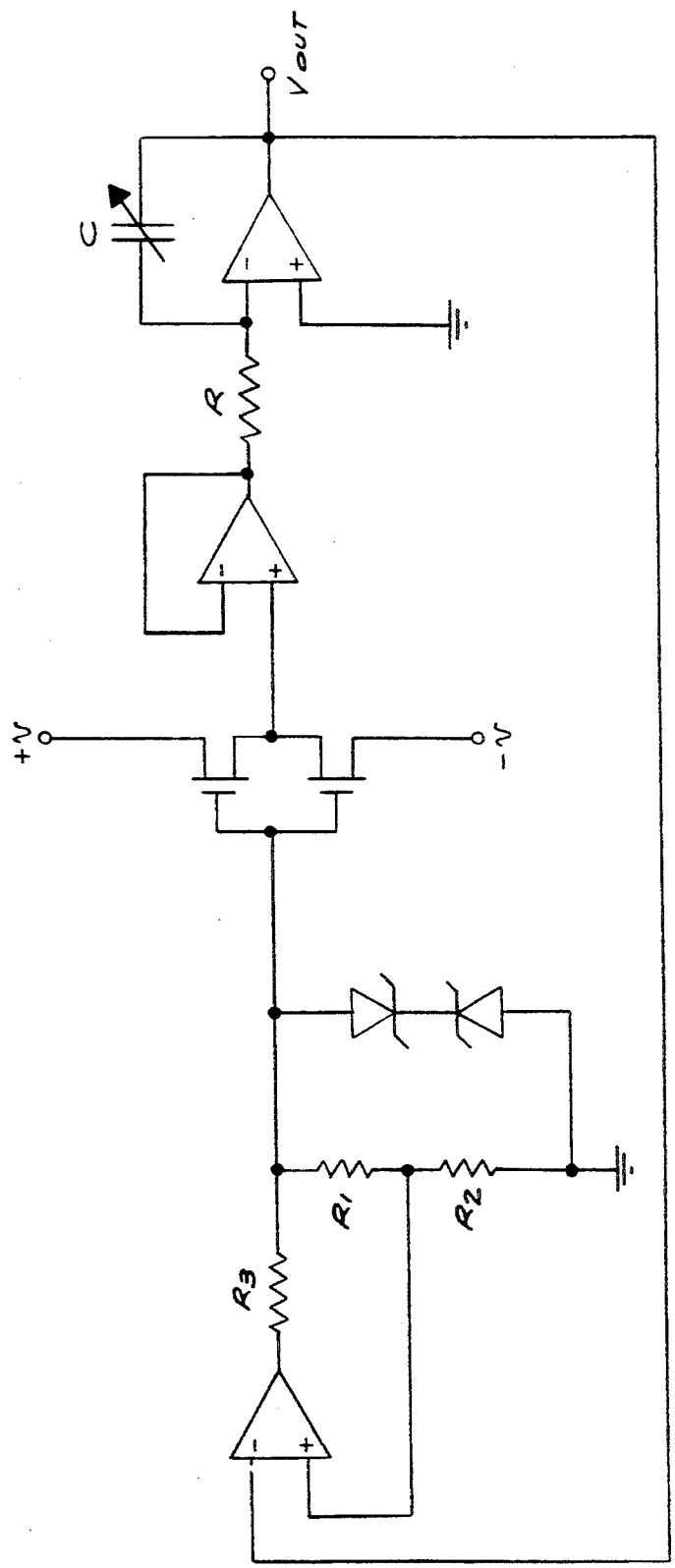
FIGS. 4 and 5 illustrate circuits which can be used with the sensor of the invention to measure temperature.

FIG. 1 illustrates a temperature sensor according to the invention which comprises a body 10 of diamond material with electrical contacts 12 and 14 applied thereto. Conductors 16 and 18 are connected to the contacts 12 and 14, respectively.

The body 10 is typically a 1 mm cube of insulating diamond material, such as a type Ia, Ib, or IIa natural or synthetic diamond crystal The crystal is selected for low levels of impurities such as boron or phosphorous, which would impair its insulating properties. The contacts 12 and 14 are preferably metallic and may comprise, for example, titanium, aluminum, nickel, chrome or other metals, The contacts need not necessarily be ohmic.

FIG. 2 illustrates an alternative embodiment of the temperature sensor, in which a diamond body 20 is formed as a layer on a doped silicon substrate by a chemical vapour deposition (CVD) process. Again, the diamond layer has a low concentration of impurities which would increase its conductivity. The doped substrate 22 is conductive or semi-conductive and acts as a tint electrical contact to the diamond layer.

The substrate can be made from a silicon wafer with a thickness of about 100 microns or greater, and having a crystallographic orientation which is within 3° to 4° of one of the main crystallographic planes.

A second, metallic contact 24 is applied to the diamond body 20. Instead of a metallic contact, a non-metallic contact could be provided, for example, by the deposition of doped amorphous semi-conductor material such as amorphous silicon or germanlure on the body 20. The semi-conductor material is doped with boron or phosphorous to a sufficiently high concentration to give the semi-conductor material a resistivity of $10^3$ Ωcm or less. A prototype sensor had a size of 1 mm square, with the diamond layer 20 being about 100 microns thick.

In both versions of the sensor, the device exhibits a capacitance between electrical contacts which is temperature dependent. FIG. 3 illustrates schematically the relationship between the capacitance of the sensor and temperature. A prototype of the fast embodiment of the sensor according to FIG. 1 had a capacitance of approximately 5 pF at 20° C., while a prototype of the second embodiment had a capacitance of about 50 pF.

The capacitance C of the sensor is determined by the dielectric constant ε of the diamond material, according to the formula:

$$C = \epsilon \epsilon_0 \frac{A}{d}$$

where A is the area of the contacts and d is the width or thickness of the diamond material between the contacts. $\epsilon_0$ is a constant, while t is a function of temperature:

$$\epsilon = 5.701 - 5.35 \times 10^{-5} T + 1.66 \times 10^{-7} T^2$$

where T is absolute temperature.

Thus, it can be seen that the capacitance of the sensor changes as a function of temperature, in a non-linear way.

The basic capacitance of the temperature sensors of the invention can be selected by adjusting the size (area) of the contacts and the width or thickness of the diamond material between the contacts. A typical range of thicknesses of the diamond material for both the above described embodiments is in the range of 10 microns to 1 mm. In the case of the first embodiment of the sensor, employing a diamond crystal the sensor will generally not be more than 1 or 2 mm in size, but sensors of the second embodiment can be much larger, with an area of several square centimeters, and a correspondingly greater capacitance, if desired.

Although it is convenient to provide a sensor with a relatively large capacitance, which reduces the sensitivity of temperature measurement apparatus incorporating the sensor to stray capacitance, it will be appreciated that increasing the size of the sensor will also reduce its speed of response, since there will be a greater mass of material to be heated by the object or environment which is being measured. Thus, a compromise must be reached according to the intended application of the sensor.

In the described embodiments of the sensor, charge carders are mobilized or localized as a function of changes in temperature, which is different from the mechanism of operation of other sensors such as radiation sensors. In a radiation sensor, carriers are generated by the interaction of ionizing particles with the structure of the diamond material. However, the described sensor responds in both modes, which can be used to advantage, as described below.

The temperature sensor of the invention may be used in conjunction with a nulling capacitance bridge, typically with a reference diamond capacitor, to measure temperature.

Figure 5:
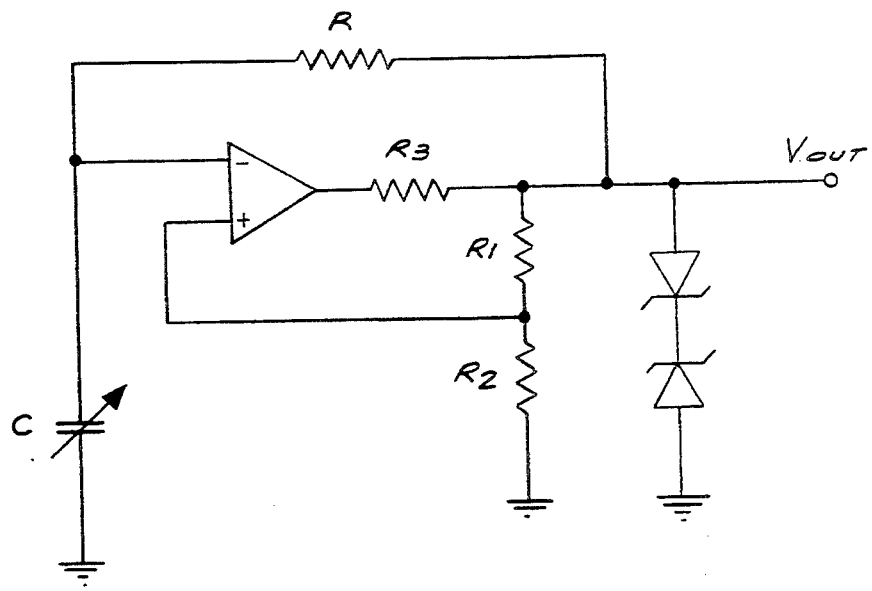

FIGS. 4 and 5 show circuits which can be used with the sensor of the invention to measure temperature and to provide an output voltage corresponding to the measured temperature.

FIG. 4 illustrates a voltage controlled oscillator (VCO) circuit in which:the temperature sensor C is used as a feedback element, The VCO is preset to run at a nominal operating frequency, which varies according to variations in the capacitance of the sensor with temperature. In the illustrated circuit, the capacitance of the sensor is given by the following formula:

$$C = T \frac{(R_1 + R_2) v}{4 R R_2 V_{out}}$$

where T is the period of oscillation of the VCO. From the above relationship between the capacitance of the sensor and the absolute temperature T (not to be confused with the period of oscillation above) a temperature value can be calculated.

The circuit of FIG. 5 is a relatively simple square wave oscillator in which the temperature sensor C is used as a non-linear feedback element. This circuit generates a square wave output waveform with a frequency which is determined by the capacitance of the sensor C and the resistors in the circuit, according to the relationship:

$$C' = \frac{T}{2R\ln\left(1 + \frac{2R_1}{R_2}\right)}$$

where T is the period of oscillation of the square wave generator.

Again, from the capacitance value thus obtained, a temperature value can be calculate.

Figure 6:
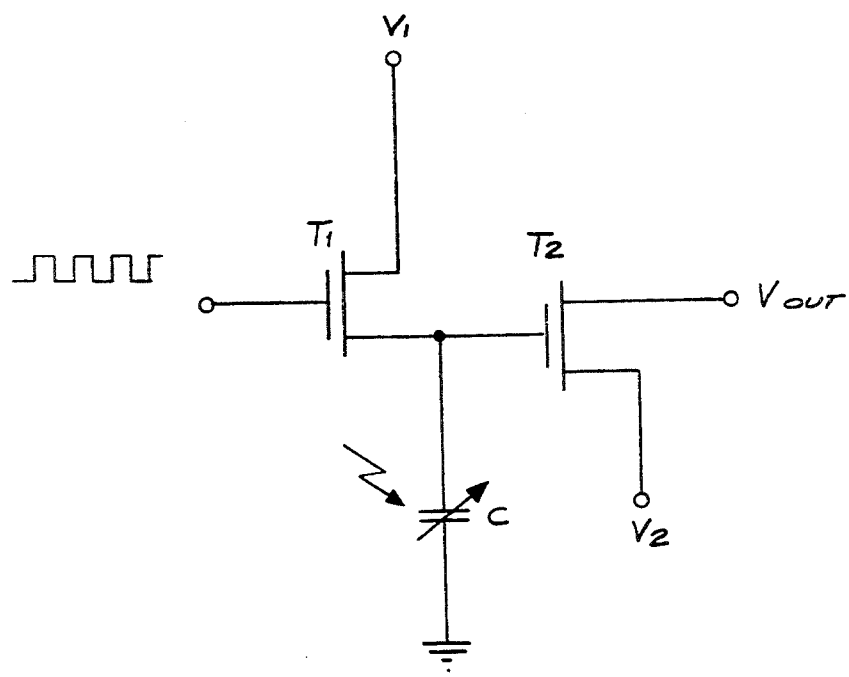
FIG. 6 illustrates a circuit which can be used with the sensor of the invention to measure radiation and/or temperature.

In FIG. 6, a simple circuit comprising field effect transistors (FETs) $T_1$ and $T_2$ is fed with a square pulse train from an oscillator. This causes the transistor $T_1$ to switch at the repetition rate of the pulse train, chafing the temperature sensor C at a constant rate. When the sensor C is subjected to nuclear or ionising radiation, it discharges at a rate proportional to the intensity of the incident radiation. The transistor $T_2$ monitors the charge on the sensor C and provides an output voltage $V_{out}$ corresponding thereto.

It will be appreciated that the fact that the sensor of the Invention is sensitive both to ionizing radiation and to temperature can be utilized to provide a measuring device which measures both temperature and incident radiation, or a radiation measuring device which is temperature compensated. In the latter case, a reference temperature compensation capacitor could be provided in the circuits of FIGS. 4 and 5, with an appropriate compensation circuit.

The described temperature sensor is physically similar to known radiation sensors which operate in a pulse mode or conduction mode, and can therefore be connected to a composite measuring circuit which measures both the capacitance off the sensor as a function of temperature, and pulse or conduction mode signals resulting from radiation incident on the sensor.

The temperature dependent capacitance measurement is used to compensate for variations in the pulse or conduction mode output of the sensor due to variation in temperature.

Because the diamond body of the temperature sensor is non conductive, it can be used in strong magnetic fields without being susceptible to errors due to induced currents. The temperature sensor of the invention is thus suited to use in conjunction with superconductors, where conventional thermistors may be unsuitable.

Due to the excellent thermal conductivity of diamond, the temperature sensors of the invention can provide a relatively rapid response compared with prior art sensors, which may use electrically insulating materials which are also thermal insulators.

I claim:

1. A temperature sensor comprising a conductive or semiconductive substrate defining a first electrical contact, a body of insulating diamond material comprising a layer of undoped diamond material deposited on the substrate by a chemical vapor deposition process, and a second electrical contact applied to the diamond body, the body having a predetermined thickness between the first and second contacts, and the contacts having a predetermined area, so that the sensor has a corresponding capacitance between the contacts which is temperature dependent.

2. A temperature sensor according to claim 1 wherein the substrate comprises doped silicon.

3. A temperature sensor according to claim 1 wherein at least one of the electrical contacts is metallic.

4. A temperature sensor according to claim 3 wherein the at least one electrical contact comprises titanium, aluminum, nickel or chrome.

5. A temperature sensor according to claim 1 wherein the second electrical contact comprises doped amorphous semiconductor material deposited on the diamond body.

6. A temperature sensor having a body of insulating diamond material comprising a type Ia, type Ib or type IIa natural or synthetic diamond crystal, and a pair of spaced apart electrical contacts applied to the body, the body of diamond material having a predetermined thickness between the contacts, and the contacts having a predetermined area, so that the sensor has a corresponding capacitance between the contacts which is temperature dependent.

7. A temperature sensor according to claim 6 wherein at least one of the electrical contacts is metallic.

8. A temperature sensor according to claim 7 wherein the at least one electrical contact comprises titanium, aluminum, nickel or chrome.

9. A temperature sensor according to claim 6 wherein at least one of the electrical contacts comprises doped amorphous semiconductor material deposited on the diamond body.

10. Temperature measurement apparatus including a temperature sensor comprising a conductive or semiconductive substrate defining a first electrical contact, a body of insulating diamond material comprising a layer of undoped diamond material deposited on the substrate by a chemical vapor deposition process, and a second electrical contact applied to the diamond body, the body having a predetermined thickness between the first and second contacts, and the contacts having a predetermined area, so that the sensor has a corresponding capacitance between the contacts which is temperature dependent; and an oscillator circuit, with the temperature sensor being connected as a feedback element in the oscillator circuit so that the output frequency of the oscillator circuit varies with and indicates the temperature of the sensor.

11. Temperature measurement apparatus including a temperature sensor having a body of insulating diamond material comprising a type Ia, type Ib or type IIa natural or synthetic diamond crystal, and a pair of spaced apart electrical contacts applied to the body, the body of diamond material having a predetermined thickness between the contacts, and the contacts having a predetermined area, so that the sensor has a corresponding capacitance between the contacts which is temperature dependent; and an oscillator circuit, with the temperature sensor being connected as a feedback element in the oscillator circuit so that the output frequency of the oscillator circuit varies with and indicates the temperature of the sensor.

* * * * *